(No Model.)
J. U. MORGAN.
BICYCLE HUB.
No. 473,426. Patented Apr. 19, 1892.
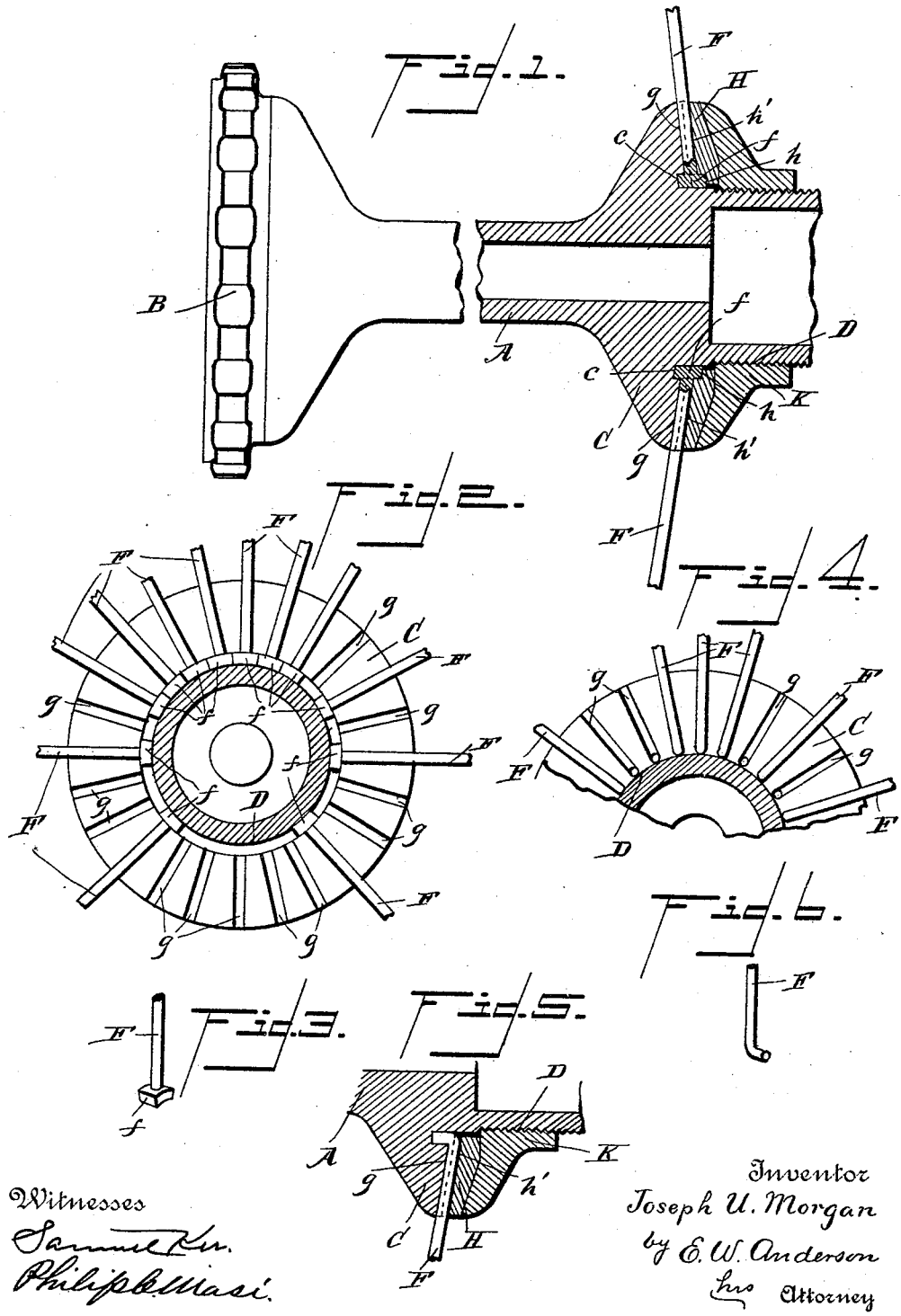
Witnesses
Samuel K...
Philip B. Masi
Inventor
Joseph U. Morgan
by E. W. Anderson
his Attorney

UNITED STATES PATENT OFFICE.

JOSEPH URIAH MORGAN, OF DUBLIN, ASSIGNOR, BY DIRECT AND MESNE ASSIGNMENTS, OF ONE-HALF TO MATT SHEW AND JOHN R. BOND, BOTH OF CAMBRIDGE CITY, INDIANA.

BICYCLE-HUB.

SPECIFICATION forming part of Letters Patent No. 473,426, dated April 19, 1892.

Application filed October 8, 1891. Serial No. 408,185. (No model.)

*To all whom it may concern:*

Be it known that I, JOSEPH URIAH MORGAN, a citizen of the United States, and a resident of Dublin, in the county of Wayne and State of Indiana, have invented certain new and useful Improvements in Bicycle-Hubs; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a vertical longitudinal section. Fig. 2 is a vertical transverse section; and Figs. 3, 4, 5, and 6 are detail views.

This invention has relation to certain new and useful improvements in bicycle-hubs; and it consists in the novel construction and combination of parts, as hereinafter specified.

In the accompanying drawings the letter A designates that portion of the hub lying between the spokes, and B the sprocket-wheel thereon.

C designates the inner enlarged cylindrical hub-section formed on the axial portion A. In front of said section is a cylindrical screw-threaded portion D. The face of the hub-section C around the axial portion is formed with an annular groove $c$, adapted to receive one-half of the T-heads $f$ on the inner ends of the spokes F, and with a series of grooves radiating from the groove $f$, designed each to receive one-half of a spoke.

H is a washer fitting loosely around the threaded portion D. Said washer on its inner face also has an annular groove $h$, corresponding to the groove $c$ of the hub-section, and is provided with a series of radial grooves $h'$, corresponding with the radial grooves $g$ of said section. The face of said section C is also beveled or inclined to the axial portion of the hub to give the spokes F the proper angle to receive the rim, and the inner face of the washer H is correspondingly shaped to fit closely thereagainst. Said spokes, as will be readily understood from the above, are held one-half in the radial grooves of the hub-section and one-half in the grooves of the washer, their T-heads being similarly held.

K is the cap or outer hub-section, which has a screw-threaded connection with the threaded portion D and which is adapted to be turned up into close engagement with the outer face of the washer. The cap or outer section K is provided with means for engagement with a wrench to permit its ready removal. By this construction the spokes are securely held in place, and should any spoke become broken it may be readily removed and replaced.

In the drawings I have shown the invention as applied to one end only of the hub.

In Figs. 5 and 6 I have shown a modified form showing the spokes having L-shaped heads seating in recesses or sockets in the hub.

Having thus fully described my invention, what I claim as new, and desire to secure by Letters Patent, is—

1. In a bicycle-hub, the combination, with the axial portion A, having thereon the enlarged hub portion C and the reduced screw-threaded portion D in front of said hub portion, of the washer H, fitting loosely around said screw-threaded portion, the outer hub-section K, having a screw-threaded connection with the portion D and arranged to set closely against the washer, and the headed spokes clamped between said washer and the hub portion C, substantially as specified.

2. In a bicycle-hub, the combination, with the axial portion A, the inner enlarged hub-section C thereon, and the cylindrical reduced threaded portion D in front of said hub-section, said hub-section having an inclined face formed with an annular groove $f$ and with a series of radial grooves $h$, communicating therewith, of the washer fitting loosely around the portion D and having an inclined inner face formed with an annular and with radial grooves corresponding each with the similar groove in the inner hub-section, the spokes having T-heads on their inner ends, resting in the annular grooves in the hub-section and washer and clamped in the radial grooves, and the outer hub-section having a screw-threaded engagement with the portion D, the meeting faces of the washer and outer section being of angular form, substantially as specified.

In testimony whereof I affix my signature in presence of two witnesses.

JOSEPH URIAH MORGAN.

Witnesses:
WM. H. KISER,
A. W. BRADBURY.